Oct. 18, 1966 B. O. POWELL 3,280,363

TELEVISION RECEIVER SWEEP TRANSFORMER WITH BLANKING WINDING

Filed Dec. 31, 1963 2 Sheets-Sheet 1

INVENTOR:
BENJAMIN O. POWELL,
BY Donald N. Timbie
HIS ATTORNEY.

Oct. 18, 1966 B. O. POWELL 3,280,363

TELEVISION RECEIVER SWEEP TRANSFORMER WITH BLANKING WINDING

Filed Dec. 31, 1963 2 Sheets-Sheet 2

INVENTOR:
BENJAMIN O. POWELL,
BY Donald N. Timbie
HIS ATTORNEY.

United States Patent Office 3,280,363
Patented Oct. 18, 1966

3,280,363
TELEVISION RECEIVER SWEEP TRANSFORMER WITH BLANKING WINDING

Benjamin O. Powell, North Syracuse, N.Y., assignor to General Electric Company, a corporation of New York Filed Dec. 31, 1963, Ser. No. 334,831
5 Claims. (Cl. 315—22)

This invention relates to television receivers, and specifically to transformers for use in the deflection and blanking circuits of a television receiver.

Blanking circuits are used to cut off or "blank" the electron beam of a television receiver picture tube during the retrace interval. Without blanking, luminous retrace lines would appear on the screen of the picture tube. These lines interfere with viewing comfort.

Both horizontal and vertical blanking are required, but this invention relates particularly to the more difficult horizontal blanking. Among the reasons for horizontal blanking being more difficult than vertical blanking are: (1) the horizontal sychronizing pulses are much shorter than the vertical; (2) the horizontal deflection coils require more power than the vertical.

In a typical horizontal sweep circuit the output of the horizontal amplifier is applied to a tap on the main winding of a horizontal sweep transformer. The main winding, which is an autotransformer type winding, supplies high voltage for the anode of the picture tube and supplies power to the picture tube horizontal deflection coils. The horizontal sweep transformer may be provided with a second winding to which is applied the output of an automatic gain control keyer.

To provide power for the horizontal blanking circuit, a blanking winding is provided on the horizontal sweep transformer. Attempts have been made in the past to use the horizontal sweep transformer as a source of blanking pulses, but these attempts have all been of limited success or extremely costly due to the ringing in the transformer windings following retrace. This ringing must be reduced if undesirable striations are to be eliminated from the raster presented on the picture tube. In the past attempts have been made to reduce the undesirable ringing in the blanking winding by including diodes and/or other impedance elements in series with the winding. A more recent attempt has been made to reduce the undesirable ringing in the blanking winding by positioning the winding in close physical proximity with a highly damped portion of the main winding, i.e., near a tap to which a diode is connected. The latter method requires accurate positioning of the blanking winding, which makes the use of present automatic coil winding machines impractical.

In accordance with this invention, undesirable ringing in the blanking winding is reduced without requiring the use of impedance elements in series with the winding, or requiring the accurate positioning of the winding with respect to a tap on the main winding. Rather, ringing is reduced by improving the design of a sweep transformer provided with a blanking winding.

It is an object of this invention to provide a horizontal sweep transformer having a blanking winding in which the undesirable ringing is reduced to a permissible level without the need for impedance elements such as diodes in the blanking circuit, or for positioning the blanking winding in close proximity to a highly damped portion of the main winding.

It is another object of this invention to provide such a horizontal sweep transformer with a blanking winding, but which transformer is relatively easy to make using present automatic coil winding machines, and therefore inexpensive to manufacture.

These objects are accomplished in accordance with this invention in one form thereof, by winding a blanking winding over a portion of the magnetic core of a horizontal sweep transformer. The blanking winding is covered with a layer of insulation. Additional windings, such as the main winding, are wound over the layer of insulation, interspaced with additional layers of insulation. These windings extend over substantially the same portion of the core as does the blanking winding.

Other objects and further details of that which is believed to be novel and the invention will be clear from the following description and claims taken with the accompanying drawings wherein:

Figure 1:
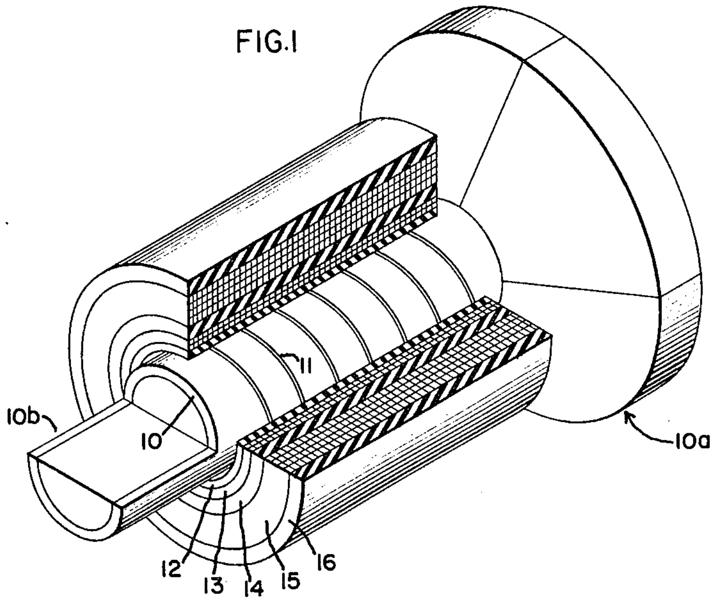
FIGURE 1 is a perspective view of a horizontal sweep transformer coil form and windings with a quadrant removed for clarity of illustration.

By reference to the drawings, and primarily to FIGURE 1, it will be seen that in the preferred embodiment of this invention the windings of a horizontal sweep transformer are wound over a cylindrical coil winding form 10, which has an enlarged cylindrical base member **10*a*. The blanking winding 11 is wound directly over the winding form 10, with its turns equally and widely spaced so as to cover substantially the entire length of the winding form. A first layer of insulation 12** is placed over the blanking winding. The layer of insulation may be an adhesive cloth tape with a high dielectric strength.

An automatic gain control or AGC winding 13 is wound over the first layer of insulation 12. A second layer of insulation 14 is placed over the AGC winding 13.

The main winding 15 of the horizontal sweep transformer is wound over the second layer of insulation. The main winding in a typical horizontal sweep transformer has over two hundred times as many turns as there are in the blanking winding, and over ten times as many turns as there are in the AGC winding. Therefore, the length of the winding form 10 is determined by the winding length needed for the main winding 15. The blanking winding and the AGC winding are wound to extend over substantially the same length of the winding form as does the main winding. A final layer of insulation 16 is placed over the main winding.

In a particular case, the main windings may comprise a thousand turns, which normally requires a winding of several layers. To construct a sweep transformer in accordance with this invention, it is first necessary to determine the length of the winding form 10 over which the main winding 15 will be wound. The blanking winding and the AGC winding are then wound to extend over substantially the same length of the winding form as does the main winding. If the main winding comprises a thousand turns, the blanking winding comprises as few as five turns. These five turns are wound directly over the winding form 10, with the turns equally and widely spaced so as to cover substantially the same length of the winding form as will the main winding. With a thousand turns in the main winding, the AGC winding comprises seventy-eight turns. When seventy-eight turns are used in the AGC winding 13, it may be necessary to wind the AGC winding with some of the turns slightly spaced apart, whereby the winding will extend over substantially the same length of the winding form as does the main winding 15.

Figure 2:
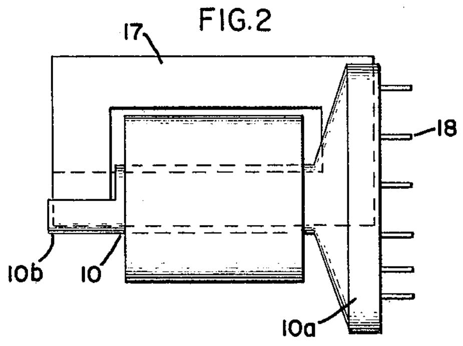
FIGURE 2 shows a complete horizontal sweep transformer.

As best shown in FIGURE 2, a leg or portion of a rectangular magnetic core 17 passes through winding form 10, forming a core-type transformer. An extension 10*b* of the winding form 10 extends along the core to insulate the leg of the magnetic core which passes through the winding form, but which extends outside of the portion of the winding form over which the windings are placed. Enlarged cylindrical base member 10*a* is provided with terminal members 18, to which are connected leads from the blanking winding 11, the AGC winding 13, the main winding 15.

Figure 3:
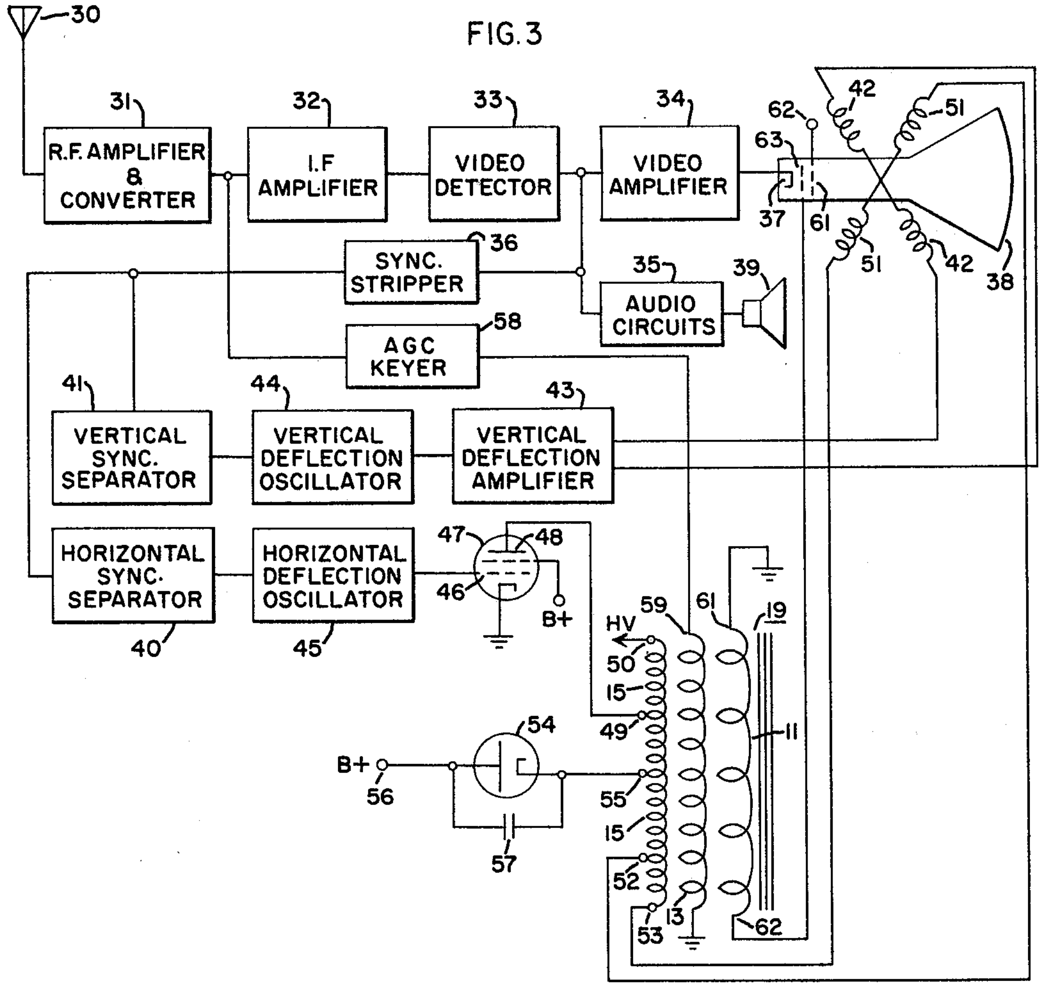
FIGURE 3 is a schematic diagram of a television receiver circuit.

Before describing the improved operation resulting from the use of a sweep transformer with a blanking winding constructed in accordance with this invention, a typical circuit in which such a sweep transformer might be used will be described. The circuit of a typical television receiver is shown in FIGURE 3, in which the well-known portions of the circuit are shown as blocks, and the horizontal deflection and blanking circuits, and particularly the horizontal sweep transformer which is the subject of this invention are shown in detail.

The circuit comprises a radio-frequency amplifier and converter 31, which receives a radio-frequency signal from antenna 30, and in turn provides an input signal to intermediate-frequency amplifier 32. The output of the intermediate-frequency amplifier 32 is the input to a video detector 33. The video detector provides the input signals for a video amplifier 34, audio circuits 35 and synchronization signal stripper 36. The output of the video amplifier 34 is connected to the cathode 37 of a picture tube 38. Speaker 39 is driven by the output of the audio circuits 35.

Both the horizontal synchronization signal separator 40 and the vertical synchronization signal separator 41 receive input signals from the synchronization signal stripper 36. Vertical deflection coils 42 of picture tube 38 are energized by vertical deflection amplifier 43, whose input is provided by vertical deflection oscillator 44, which in turn receives its input from the vertical synchronization signal separator 41. The output of the horizontal synchronization signal separator 40 is applied to a horizontal deflection oscillator 45, the output of which is applied to control electrode 46 of tube 47.

Tube 47 represents the horizontal output amplifier stage. Plate 48 of tube 47 is connected to a tap 49 on the main winding 15 of horizontal sweep transformer 19, which is constructed in accordance with this invention. The main winding 15, which is an autotransformer type winding, may be used to provide a suitable high voltage for the anode of picture tube 38, if a rectifier system, not shown, is connected to the end 50 of the main winding closest to the tap 49. The horizontal deflection coils 51 are connected across a portion of the main winding 15 between tap 52 and end 53. A damper diode 54 is connected between tap 55 on main winding 15 and terminal 56 to which is applied positive potential "B+" operating voltage. The anode of diode 54 is connected to terminal 56. A capacitor 57 is connected across diode 54. The horizontal deflection output circuit described thus far is conventional, and well-known in the art.

In the particular television receiver circuit shown in FIGURE 3, an automatic gain control (AGC) keyer 58 is connected to the output of the radio-frequency amplifier and converter 31. The output of the AGC keyer is supplied to end 59 of the AGC winding 13 of the horizontal sweep transformer 19. The other end 60 of the AGC winding 13 is grounded. End 61 of the horizontal blanking winding 11 is connected to ground. The other end 62 of the blanking winding is connected to control grid 63 of television picture tube 38.

The circuit of FIGURE 3 operates as follows. The horizontal output circuit, with the exceptiton of the blanking winding 11, operates in a conventional manner. The plate 48 of tube 47 receives its operating voltage from terminal 56 through damper diode 54, tap 55 on main winding 15, that portion of the main winding included between taps 55 and 49, and finally through the connection between tap 49 and plate 48. In response to a signal being applied to control electrode 46 of tube 47, a periodic pulsating signal will be generated in the main winding 15. Since the tube 47 is periodically cut-off, the voltage in main winding 15 will include periodic "flyback" voltage pulses of relatively large magnitude which are used for generating a high voltage at end 50 of the main winding. The damper diode 54 insures a proper wave shape in horizontal deflection windings 51. The aforementioned voltage pulses in main winding 15 will by transformer action cause similar pulses to appear in blanking winding 11, thereby providing a blanking signal for control grid 63 of the television tube 38.

Figure 4:
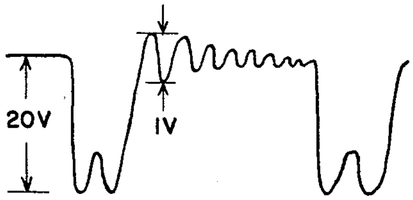
FIGURE 4 shows the voltage output waveform of a blanking winding of a prior art horizontal sweep transformer.
Figure 5:
FIGURE 5 shows the voltage output waveform of a blanking winding of a horizontal sweep transformer constructed in accordance with this invention.

As is best shown in FIGURE 1, and as is also shown in schematic form in FIGURE 3, the blanking winding 11, and the AGC winding 13 are wound so as to cover substantially the same length of the core as does the main winding 15. The benefit of the blanking winding 11 being wound over substantially the same length of the core as is the main winding 15 can best be seen by making reference to FIGURES 4 and 5. In order to point out with particularity the benefit of constructing a horizontal sweep transformer with a blanking winding in accordance with this invention, FIGURE 4 shows the waveform of a voltage induced in a blanking winding of a transformer similar in construction to that of the subject invention, but not incorporating the novel features of the sweep transformer of the subject disclosure. The waveform shown in FIGURE 4 represents the voltage induced in a blanking winding having the same number of turns as the winding of which FIGURE 5 is representative, but in which the turns are closely wound in a concentrated group at the mid-point of the portion of the core over which the main winding is wound. With the blanking winding closely wound, it is not tightly coupled inductively to the entirety of said main winding, but rather is most tightly coupled to those turns of the main winding at the center of the winding length, but very loosely coupled to the turns at either end. By distributing the turns of the blanking winding evenly with respect to the turns of the main winding, it is possible to tightly couple inductively the entirety of the blanking winding to the entirety of the main winding, thereby producing in the blanking winding a blanking signal that is substantially free from undesirable ringing, as best shown in FIGURE 5. As is shown in FIGURES 1 and 3, the turns of the AGC winding are also evenly distributed with respect to the turns of the blanking winding and the main winding, thereby insuring tight inductive coupling between the entirety of the AGC winding, the entirety of the main winding, and the entirety of the blanking winding.

It will now be appreciated that a sweep transformer provided with a blanking winding in accordance with this invention will provide a blanking signal of high quality, and at a very reasonable expense. Winding of the blanking winding in accordance with this invention is economically much more feasible than the provision of additional impedance elements, such as diodes, in series with the blanking winding or the accurate positioning of the blanking winding 11 with respect to a tap on the main winding, such as with respect to tap 55 on the main winding 15.

While a preferred embodiment of the invention has been shown, various other modifications are possible. For example, the horizontal sweep transformer may be constructed without an AGC winding, should automatic gain control be provided in a different manner. In the opposite sense, the sweep transformer could be provided with additional windings, the turns of these additional windings being evenly distributed with respect to the turns of the main and blanking windings, so as to be tightly coupled inductively to the entirety of said blanking winding and the entirety of said main winding. A sweep transformer constructed in accordance with this invention could also be used in the vertical sweep circuit of a television receiver. While a preferred embodiment of the subject invention has been shown, and other embodiments have been discussed, various other embodiments and modifications thereof will be apparent to those skilled in the art, and will fall within the scope of the invention as defined in the following claims.

What I claim as new and desire to secure by Letters Patent of the United States is:

1. A sweep transformer for use in a television receiver comprising:
(a) a magnetic core;
(b) a blanking winding adapted to be connected to a control grid of the picture tube of the receiver, said blanking winding being wound over a portion of said magnetic core and extending over substantially the entire length of said portion, said winding having its turns equally spaced along said length of said portion;
(c) a main winding, wound over said blanking winding, and extending over substantially the same length of said portion of said core as does said blanking winding, and having a tap thereon for connection to a deflection signal source;
whereby the turns of said blanking winding are evenly distributed with respect to the turns of said main winding so as to tightly couple inductively the entirety of said blanking winding to the entirety of said main winding, thereby producing in said blanking winding a blanking signal that is substantially free from undesirable ringing.

2. A sweep transformer for use in a television receiver comprising:
(a) a magnetic core;
(b) a blanking winding adapted to be connected to a control grid of the picture tube of the receiver, said blanking winding being wound over a portion of said magnetic core, said winding having its turns widely spaced so as to extend over substantially the entire length of said portion of said core;
(c) a main winding, wound over said blanking winding, having its turns closely spaced and extending over substantially the same length of said portion of said core as does said blanking winding, and having a tap thereon for connection to a deflection signal source;
whereby the turns of said blanking winding are evenly distributed with respect to the turns of said main winding so as to tightly couple inductively the entirety of said blanking winding to the entirety of said main winding, thereby producing in said blanking winding a blanking signal that is substantially free from undesirable ringing.

3. A sweep transformer for use in blanking and deflection circuits of a television receiver comprising:
(a) a magnetic core;
(b) a hollow coil form placed over a portion of said magnetic core;
(c) a blanking winding adapted to be connected to a control grid of the picture tube of the receiver, said blanking winding being wound on said coil form, said winding having its turns equally spaced along the length of said coil form;
(d) a main winding, wound over said blanking winding, and extending over substantially the same length of said coil form as does said blanking winding, and having a tap thereon for connection to a deflection signal source;
whereby the turns of said blanking winding are evenly distributed with respect to the turns of said main winding so as to tightly couple inductively the entirety of said blanking winding to the entirety of said main winding, thereby producing in said blanking winding a blanking signal that is substantially free from undesirable ringing.

4. A sweep transformer for use in blanking and deflection circuits of a television receiver comprising:
(a) a magnetic core;
(b) a hollow coil form placed over a portion of said magnetic core;
(c) a blanking winding adapted to be connected to a control grid of the picture tube of the receiver, said blanking winding being wound on said coil form, said winding having its turns equally spaced along the length of said coil form;
(d) an AGC winding, adapted to be connected to an AGC keyer, said AGC winding being wound over said blanking winding, and extending over substantially the same length of said coil form as does said blanking winding;
(e) a main winding, wound over said AGC winding, and extending over substantially the same length of said coil form as does said blanking winding, and having a tap thereon for connection to a deflection signal source;
whereby the turns of said blanking winding are evenly distributed with respect to the turns of said main winding and the turns of said AGC winding, so as to tightly couple inductively the entirety of said blanking winding to the entirety of said main winding and the entirety of said AGC winding, thereby producing in said blanking winding a blanking signal that is substantially free from undesirable ringing.

5. A sweep transformer for use in horizontal blanking and deflection circuits of a receiver comprising:
(a) a magnetic core;
(b) a hollow coil form placed over a portion of said magnetic core;
(c) a blanking winding adapted to be connected to a control grid of the picture tube of the receiver, said blanking winding being wound on said coil form, said winding having its turns widely spaced along the length of said coil form so as to extend over substantially the entire length of said coil form;
(d) a first layer of insulation covering said blanking winding;
(e) an AGC winding, adapted to be connected to an AGC keyer, said AGC winding being wound on said first layer of insulation, and extending over substantially the same length of said coil form as does blanking winding;
(f) a second layer of insulation covering said AGC winding;
(g) a main winding, wound on said second layer of insulation, and extending over substantially the same length of said coil form as does said blanking winding;
whereby the turns of said blanking winding are evenly distributed with respect to the turns of said main winding and the turns of said AGC windings so as to tightly couple inductively the entirety of said blanking winding to the entirety of said main winding and the entirety of said AGC winding, thereby producing in said blanking winding a blanking signal that is substantially free from undesirable ringing.

No references cited.

DAVID G. REDINBAUGH, *Primary Examiner.*

T. A. GALLAGHER, *Assistant Examiner.*